US012621038B2

(12) United States Patent (10) Patent No.: US 12,621,038 B2
Camacho et al. (45) Date of Patent: May 5, 2026

(54) OPTIMIZING BEAM-SEARCH TIME AND BEAM SELECTION IN WIRELESS NETWORKS

(71) Applicant: Dell Products L.P., Round Rock, TX (US)

(72) Inventors: Ludwing Ferney Marenco Camacho, Santa Rita do Sapucaí (BR); Luiz Eduardo Hupalo, Videira (BR); Felipe Agusto Pereira de Figueiredo, Santa Rita do Sapucaí (BR); Cristiani Vilela Ribeiro Gumarães, Santa Rita do Sapucaí (BR); Jaumir Valença da Silveira Junior, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/422,832

(22) Filed: Jan. 25, 2024

(65) Prior Publication Data

US 2025/0247140 A1     Jul. 31, 2025

(51) Int. Cl.
| | |
|---|---|
| H04B 7/02 | (2018.01) |
| H04B 7/06 | (2006.01) |
| H04B 7/08 | (2006.01) |
| H04W 64/00 | (2009.01) |

(52) U.S. Cl.
CPC ........... H04B 7/0696 (2023.05); H04B 7/088 (2013.01); H04W 64/006 (2013.01)

(58) Field of Classification Search
CPC .... H04B 7/0696; H04B 7/088; H04W 64/006

USPC ................ 375/267, 260, 259, 219, 295, 316
See application file for complete search history.

(56) References Cited

U.S. PATENT DOCUMENTS

| | | | |
|---|---|---|---|
| 2022/0039080 A1* | 2/2022 | Khoryaev | H04W 4/025 |
| 2022/0271818 A1* | 8/2022 | Svendsen | H04B 7/0695 |
| 2024/0144087 A1* | 5/2024 | Massoli | H04B 7/0695 |

OTHER PUBLICATIONS

Jiang, et al, "Computer Vision Aided Beam Tracking in A Real-World Millimeter Wave Deployment." arXiv, Nov. 2021.
Jiang, et al, "LiDAR Aided Future Beam Prediction in Real-WorldMillimeter Wave V2I Communications." arXiv, Mar. 2022.
Riley, et al., "The ns-3 Network Simulator" Modeling and Tools for Network Simulation, Springer Berlin Heidelberg, pp. 15-34, 2010.
Mezzavilla et al, "End-to-End Simulation of 5GmmWave Networks," IEEE Communications Surveys & Tutorials, vol. 20, No. 3. IEEE, pp. 2237-2263, 2018.
Gawłowicz et al, "ns3-gym: Extending OpenAI Gym for Networking Research." arXiv, Oct. 2018.

* cited by examiner

*Primary Examiner* — Zewdu A Kassa
(74) *Attorney, Agent, or Firm* — Workman Nydegger

(57) ABSTRACT

Optimizing or improving the operations of selecting a beam pair for communication and updating the beam pair are disclosed. A model is trained such that a beam pair can be selected based on a geolocation of user equipment. Once a beam pair is selected, the node and/or user equipment are configured such that subsequent transmissions use the selected beam pair. The update time is determined using the user equipment's location and velocity. The update period is based on a time required for the user equipment to reach an area associated with a different beam pair as determined using a decision function of the beam pair selection model.

18 Claims, 15 Drawing Sheets

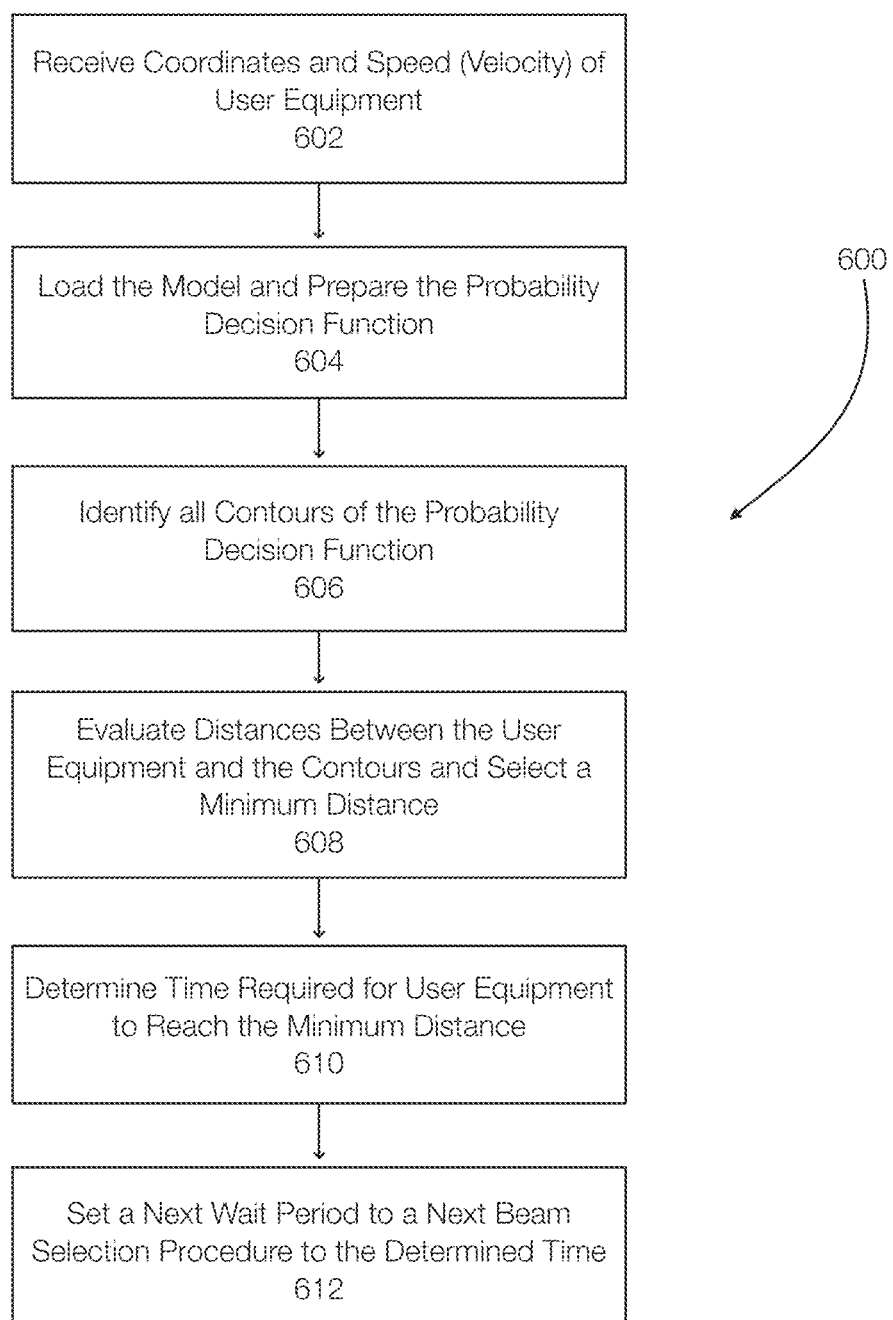

Receive Coordinates and Speed (Velocity) of
User Equipment
602

Load the Model and Prepare the Probability
Decision Function
604

Identify all Contours of the Probability
Decision Function
606

Evaluate Distances Between the User
Equipment and the Contours and Select a
Minimum Distance
608

Determine Time Required for User Equipment
to Reach the Minimum Distance
610

Set a Next Wait Period to a Next Beam
Selection Procedure to the Determined Time
612

| Simulation Parameter | Value |
|---|---|
| LOS Condition | Always with Line-of-Sight |
| Carrier Frequency | 28 GHz |
| Bandwidth | 100 MHz |
| gNB Height | 10 m |
| gNB Tx Power | 20 dBm |
| UE Tx Power | 10 dBm |
| Noise Figure | 7 dBm |
| Channel Update Period | 100 ms |
| Channel Update Period on sampling | 1 ms |
| Scenario | 3GPP TR 38.901, Table 7.4.1-1 for the UMa Scenario |
| Path-loss Model | Urban Macro (UMa) |
| gNB Antenna Array | $1 \times 2$ |
| UE Antenna Array | $8 \times 8$ |
| UE Mobility Model | Random walk |
| UE Speed on Sampling | Sampled from $\mathcal{N}(\mu, \sigma^2)$ with $\mu = 1.5$ and $\sigma^2 = 0.04$ |
| UE Speed on Validation | 2 m/s |
| Exhaustive beam-search period | 50 ms |
| Exhaustive beam-search period on sampling | 1 ms |
| Simulation Time on Sampling | 0.2 s |
| Simulation Time on Validation | 30 s |

OPTIMIZING BEAM-SEARCH TIME AND BEAM SELECTION IN WIRELESS NETWORKS

FIELD OF THE INVENTION

Embodiments of the present invention generally relate to improving beam search time and beam selection in wireless networks. More particularly, at least some embodiments of the invention relate to systems, hardware, software, computer-readable media, and methods for improving network performance by reducing latency and overhead associated with beam searching and beam selecting in wireless networks.

BACKGROUND

In order to obtain greater bandwidths and transmit at higher rates, particularly for frequencies above 24 Giga-Hertz (GHz), it is useful to focus transmitted power in specific directions to overcome signal attenuation. This is often achieved using beamforming techniques. Beamforming techniques may include searching for a beam pair that improves or maximizes the received power. However, the time required to search for the optimum beam pair or even a suitable beam pair is significant. In mmWave frequencies, for example, beam-searching is a complex and time consuming process.

Conventional beam pair selection techniques, such as a periodic exhaustive search, may not be able to adapt quickly to changing network conditions and may lead to suboptimal beamforming execution and reduced network performance due to consumption of time and resources that could otherwise be directed to data transmission.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 6 discloses aspects of a method for determining a beam selection period;

FIG. 8A discloses aspects of parameters used to generate or collect a dataset for training a model related to selecting a beam pair in a network;

DETAILED DESCRIPTION OF SOME EXAMPLE EMBODIMENTS

Figure 1:
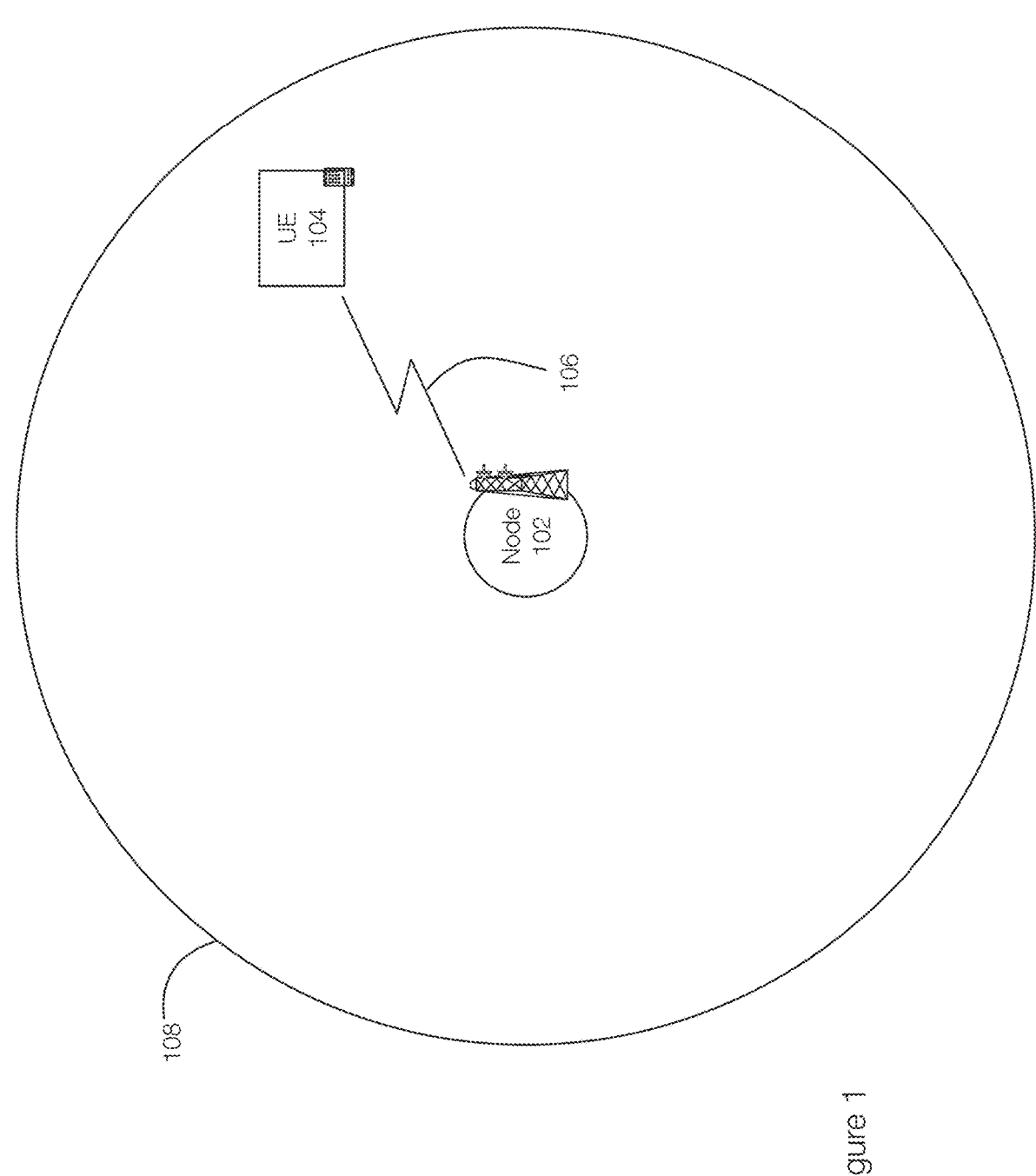
FIG. 1 discloses aspects of a network such as a cellular network.

Embodiments of the present invention generally relate to improving beam pair searching time and beam pair selection in wireless networks. More particularly, at least some embodiments of the invention relate to systems, hardware, software, computer-readable media, and methods for improving network performance by reducing latency and overhead while improving energy efficiency in the context of beam-searching and beam pair selection in networks. Embodiments of the invention further relate to improving or optimizing a beam pair update period.

In networks including cellular networks, beam pairs are used by a node (e.g., a gNodeB (gNB)) to communicate with a user equipment (UE). Beam pairs are often used in the context of beamforming technologies. However, it is often necessary to change the beam pair used for communication due in part to movement of the user equipment in the environment. Conventionally, an exhaustive beam pair search is performed and a specific beam pair is selected after performing the exhaustive search. The beam pair search is performed according to a beam pair update period. Performing the beam pair search and selection operation periodically (according to the beam pair update period) can impact the time available for data transmission using the selected beam pair. Embodiments of the invention advantageously improve or optimize these operations to reduce latencies and allow more time to be used for data transmission purposes.

Embodiments of the invention are discussed in the context of mmWave frequencies, 5G and 5G NR networks or, more generally, frequency bands above 24 GHz. Embodiments of the invention, however, may be applied to other wireless networks and frequency bands in presence of a beamforming technologies, including, but not limited to, codebook beamforming. Beamforming technologies are used to setup and use a beam pair. Embodiments of the invention are configured to select the beam pair such that the beamforming components of the node can be configured accordingly. More specifically, communications or radio transmissions between a node and a user equipment may be performed by selecting a beam pair or, for example, by configuring a pair of complex vectors for the node (gNB) and the user equipment. This can be done by instantaneously computing the beam pair (e.g., the vectors) or by selecting a best combination of vectors from a list of predefined vectors. Codebook beamforming includes searching the codebook for the best combination of vectors.

Embodiments of the invention include a machine learning based methodology configured to optimize the beam pair searching time and beam pair selection in wireless networks. A machine learning model may be trained to provide real-time optimization of the beam forming direction. Experimental results demonstrate that, by way of example only, a reduction of 87.5% in beam pair search/selection time is achieved. Embodiments of the invention have an average beam pair update period (e.g., time between beam pair searches or beam selection period) of 1165 milliseconds (ms) compared to an fixed beam update or selection period of 50 ms when using an exhaustive search. Embodiments of the invention thus improve network performance by reducing latency and overhead and by increasing energy efficiency. Embodiments of the invention can be applied to various beam management procedures, including initial access, beam change, and serving cell changes. Embodiments of the invention may be implemented, by way of example only, as software component, a hardware module, XApp for O-RAN architecture, or the like.

Embodiments of the invention may start by collecting beam pair data from a base station (or node) environment in order to train a model configured to identify a recommended beam pair and a model configured to optimize or improve a beam forming optimization period. The beam pair optimization period refers to a time period between beam pair search/selection operations.

In one example, once a model is trained using the collected data and deployed, embodiments of the invention are able to perform beam forming searching/selection using only the coordinates of user equipment. Rather that performing an exhaustive search, the machine learning model can quickly select a beam pair in less time. The beam period update time can be dynamically updated based on the position and/or velocity of the user equipment.

Embodiments of the invention are discussed in the context of a system model and the problem of searching for/selecting a beam pair. An example system model includes a single mmWave gNB (a gNodeB) or node and a single user equipment (UE). A gNB, for example, is a node in a cellular network that provides connectivity to the user equipment within the node's range. Both the node and the user equipment are equipped with a uniform planar array (UPA) in one example. The UPA includes $N^h$ horizontal elements and $N^v$ vertical elements. The UPA includes $N=N^h N^v$ elements. In one example, the number of elements of the UPA of the node and the number of elements of the UPA of the user equipment are the same. However, the size of the UPA of the user equipment are typically smaller. The user equipment may also be equipped with a GPS (Global Positioning System) receiver capable of collecting the geolocation of the user equipment in real-time and sending the geolocation data to the node.

All possible beamforming vectors for both the node and the user equipment are encompassed in codebooks. A codebook, in one example, may be defined as a collection $$\mathcal{B} = \{b_i\}_{i=1}^M,$$

where $$b_i \in \mathbb{C}^{1 \times Q}$$

is the i-complex beamforming vector from all M predefined beamforming vectors and Q is the length of each beamforming vector. The received signal for a transmitted symbol, x, with unit power is denoted as:

$$y = \sqrt{P_{tot}}\, w_j^H H f_i x + w_j^H n,$$

where n is an additive white Gaussian noise (AWGN) with power $N_0$, H is a channel matrix, $\sqrt{P_{tot}}$ is a symbol energy, $f_i$ and $w_j$ are the beamforming vectors for the transmitter node (gNB) and receiver (UE), respectively. In this example, the superscript H is a conjugate transpose of the beamforming vectors (i.e., $w^H = [w^T]^*$). Because $f_i$ and $w_j$ are selected from the gNB codebook $$\mathcal{F} \equiv \{f_i\}_{i=1}^K$$

and the UE codebook $$\mathcal{W} \equiv \{w_j\}_{j=1}^L,$$

there are a total of $M_B = KL$ different beam pairs $(w_i, f_j)$ available for transmission.

An exhaustive search for selecting the best or suitable beam pair is conventionally performed as follows. Considering $(w_i, f_j)$ to be an $n^{th}$ available beam pair for transmission, the received power for this pair is given by:

$$p_n = |w_j H f_i|^2.$$

The set of received powers for all $M_B$ possible beam pairs are consolidated on the following vector of received powers:

$$p = [p_1, p_2, \dots, p_n, \dots p_{M_B}].$$

The optimal beam pair, s, is obtained by computing s=argmax{p}, which involves an exhaustive search. The exhaustive search procedure is performed periodically in fixed intervals in one example. Embodiments of the invention, rather than perform an exhaustive search, which requires substantial time, are configured to select a beam pair using a trained machine learning model.

FIG. 1 discloses aspects of a network such as a cellular network. FIG. 1 illustrates a node 102 (e.g., a gNB) and user equipment 104 (e.g., a mobile device). The node 102 may be associated with a range 108. The node 102 may provide connectivity to devices within the range 108. The beam pair 106 represents the signals used by the node 102 and the UE 104 for communication/transmission purposes.

Initially, embodiments of the invention include a sampling process to collect optimal beam pairs in an environment (e.g., such as may be related to the node 102). The beam pairs being collected are generally tied to random spatial positions. The beam pair combines node-UE (or gNB-UE) beamforming vectors selected from the associated codebooks.

In one example, the space around the node 102 may be divided into areas or spaces. Beam pairs are collected with respect to each of the areas or spaces. The optimal beam pair is gathered by finding, for example, beam pairs with the highest power spectral density combination. In general, the optimal beam pair can be obtained by analyzing another signal quality measurement. By way of example, other signal quality measurements that may be used as a basis for collecting beam pairs include signal strength, noise level, signal to noise ratio, or the like or combination thereof. In some examples, other characteristics such as frequency/wavelength may be used. The random position tied to the selected beam pair is an average of all realizations in which the optimal beam pair was selected.

Figure 2:
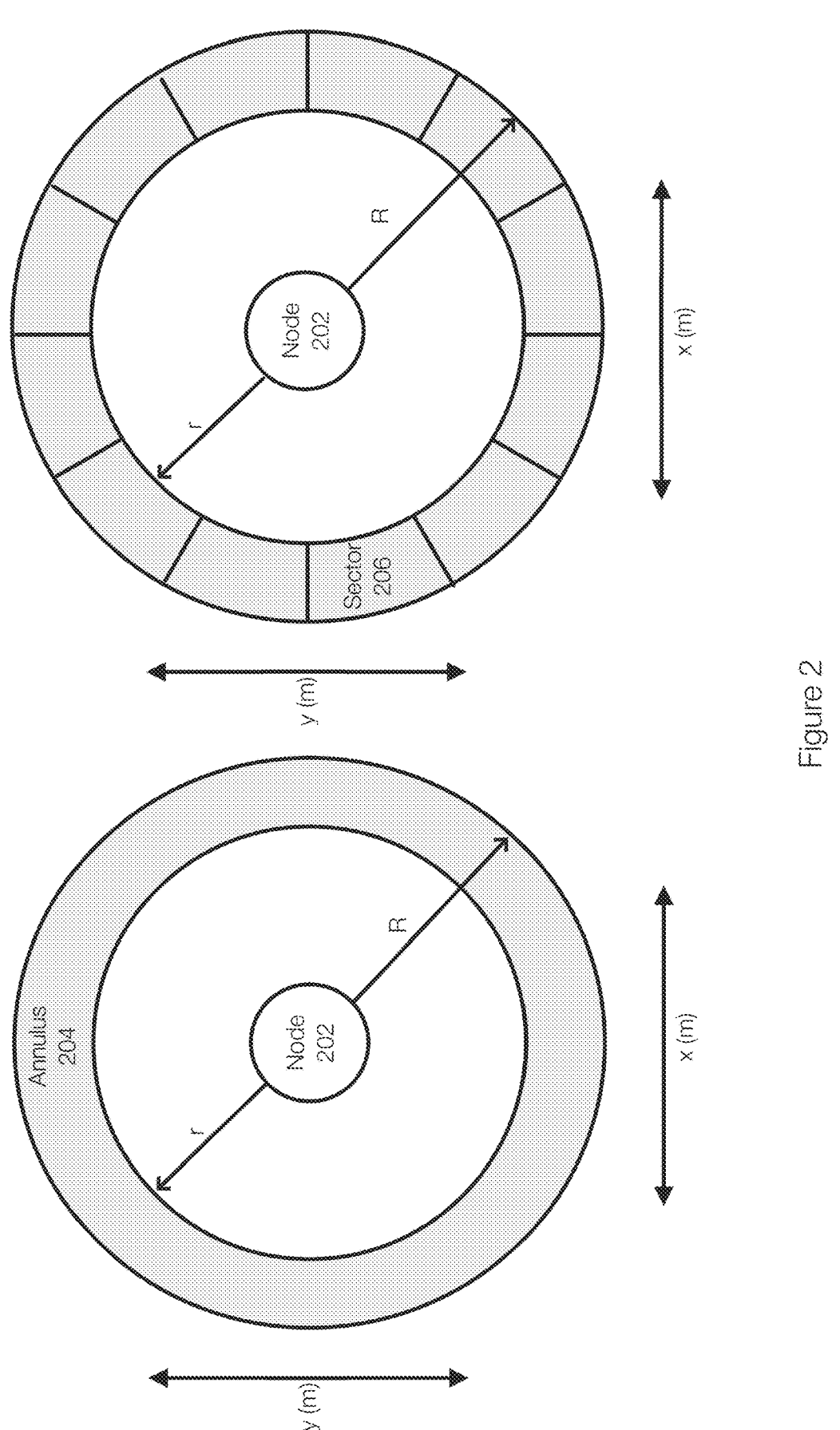
FIG. 2 discloses aspects of collecting data related to optimal beam pairs in a network.

FIG. 2 discloses aspects of collecting data related to selecting optimal beam pairs in a network. FIG. 2 illustrates a process of collecting data to characterize a space around a node 202 in terms of beam pairs, their average received power spectral density, and user equipment coordinates. Embodiments of the invention may capture small scale fading on a channel and a path loss as the user equipment moves apart from the node 202.

To perform sampling, the space around the node 202 is divided into a plurality of annuli. FIG. 2 illustrates an annulus 204. By way of example, a width of the annulus 204 may be fixed. In one example, R−r=10 meters. The annulus 204 may divided into sectors, which are represented by the sector 206. Each of the sectors, in this example, covers $$\frac{\pi}{3}$$

radians or 30 degrees.

In one example, data is collected in each of the sectors. Collecting data includes collecting beam pairs, a signal quality measurement (e.g., power spectral density, signal strength, noise, signal to noise ratio), and user equipment coordinates multiple times (e.g., as many as possible) such that small-scale fading present on the wireless medium is overcome. This may be achieved by decreasing the channel update time. The imperfections of the physical medium in which the electromagnetic waves propagate are eliminated by finding, for example, the beam pair with the highest power spectral density, averaging coordinates attached to the selected beam pair and storing these values in a database. In this manner, misconceived measures of the beam pairs are avoided because of this large-scale propagation characterization. The collected data is processed to remove possible invalid measures that can occur due to, by way of example, measurement imperfections.

In this manner, each of the sectors in each annulus are associated with a beam pair with the highest power spectral density and a set of coordinates.

Once this data has been collected, a machine learning model is trained to predict an optimal beam pair using only geolocation data of a user equipment in one example or geolocation data of the node (the gNB) and the user equipment. The model may have high accuracy based on the methodology of collecting the geolocation data, which overcame small scale fading and other aspects of the environment.

Figure 3:
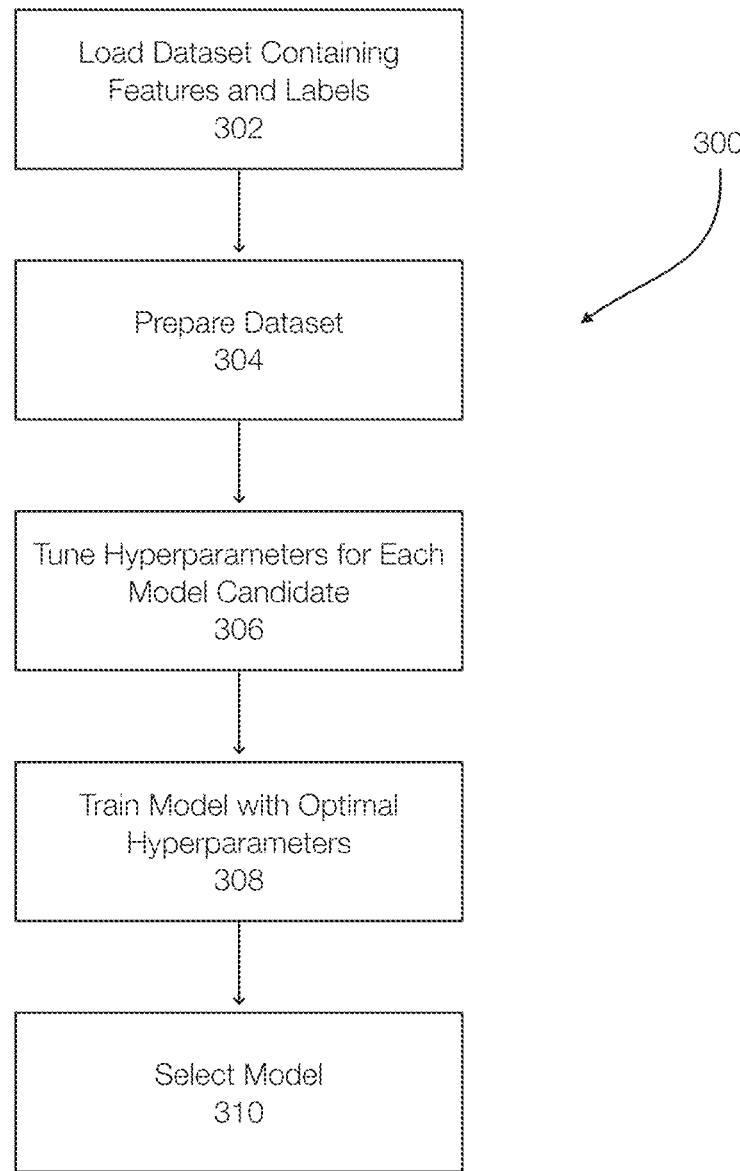
FIG. 3 discloses aspects of training a model to predict a beam pair for use by a node and a user equipment.

FIG. 3 discloses aspects of training a model to predict a beam pair for use by a node and a user equipment. In one example, a variety of different models or model architectures (e.g., multilayer perceptron, random forest, K-Nearest neighbors) may be trained. After training the models, the model with the best accuracy may be selected and deployed. Thus, each of the models being trained is a candidate model.

In the method 300, the dataset containing features and labels is loaded 302 or accessed. The dataset may be divided into a training dataset and a validation dataset. The training dataset, in one example, includes the dataset of optimal beam pairs previously collected. In some examples, data may be collected for each node in a larger network. This allows the model to be trained for specific nodes such that the beam selection operation accounts for the physical environment of that specific node.

The dataset is prepared 304 (e.g., cleansed and processed) in preparation for training the candidate models. For each of the candidate models, hyperparameters are tuned 306 for each of the candidate models. The hyperparameters, in one example, are intrinsic parameters used to control the learning process for each candidate model including normalization methods and coordinate systems (e.g., cartesian, polar). The candidate models are then trained 308 with optimal hyperparameters using the labeled training dataset in one example.

Next, the model with the best accuracy (e.g., using the validation dataset) is selected 310. In one example, when selecting based on accuracy, the model type for a first node (a first gNB) may differ from the model type selected for a second node (a second gNB), even if the nodes are in the same network or associated with the same provider.

Figure 4:
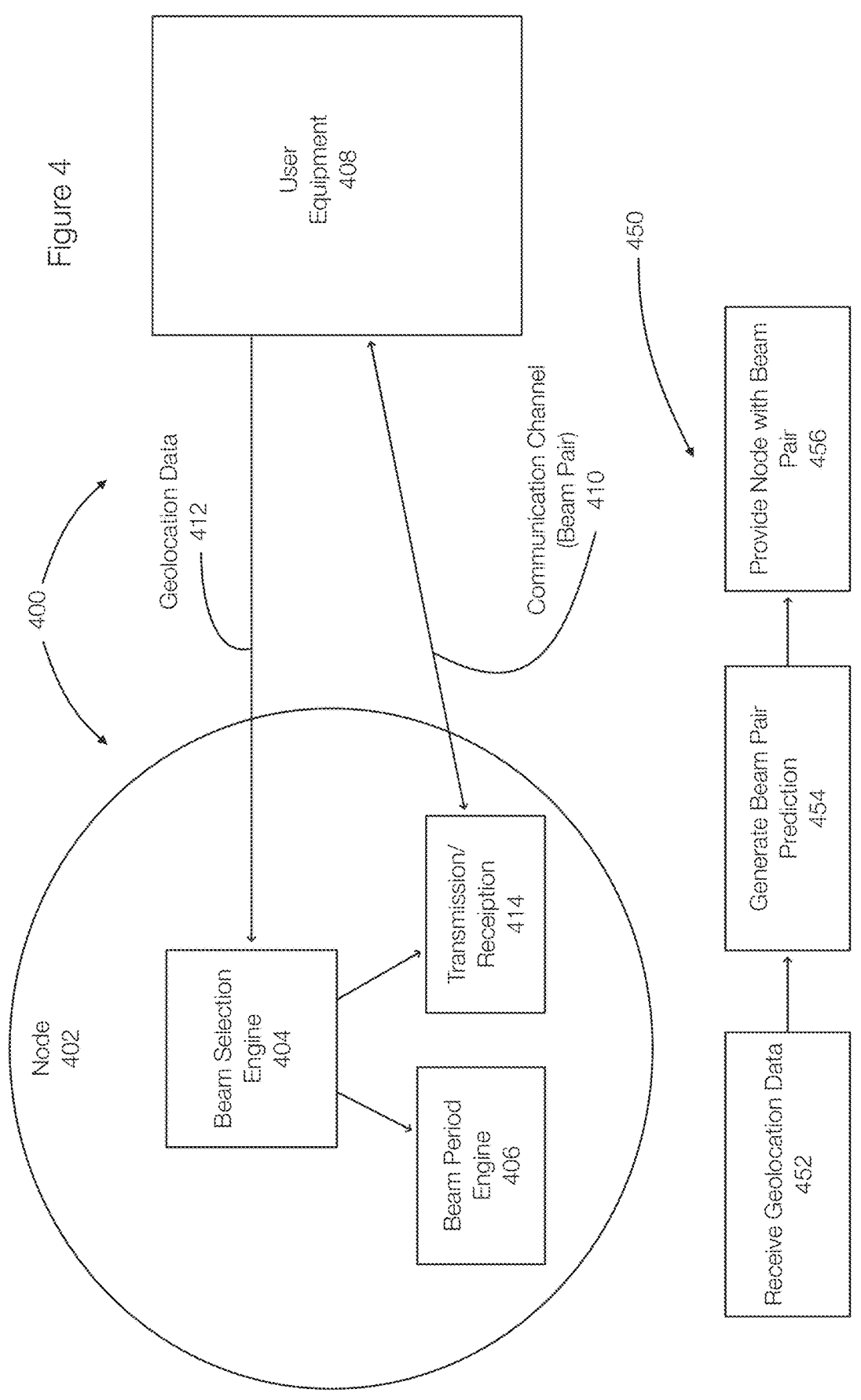
FIG. 4 discloses aspects of searching for and selecting a beam pair in a network.

FIG. 4 discloses aspects of searching for and selecting a beam pair in a network. FIG. 4 illustrates a single user equipment, but embodiments of the invention may operate for multiple user equipment or other devices connected with the node 402. FIG. 4 illustrates a system 400 or environment that includes a node 402 (a gNB) and a user equipment 408 (e.g., a mobile phone, tablet). Communication (e.g., data transmission, voice transmission, Internet access) occurs over a communication channel 410, which is an example of a beam pair. More specifically, a beam pair may include a link from the node 402 to the user equipment 408 (e.g., a downlink) and a link from the user equipment 408 to the node 402 (e.g., an uplink). The efficiency of the link, for example in terms of power spectral density and/or other signal quality measurements, may depend on selecting a best beam pair.

More specifically, FIG. 4 illustrates a beam selection engine 404, which is an example of a model configured to predict or recommend an optimal beam pair based on geolocation data. As illustrated in the method 450, the node 402 or the beam selection engine 404 may receive 452 geolocation data 412 from a user equipment 408. Coordinates (e.g., GPS data, (x,y,z) data) are examples of the geolocation data 412.

The beam selection engine 404 predicts 454 an optimal beam pair or a beam pair that is most likely to be suitable or optimal for communication and provides 456 the node 402 with information regarding the predicted beam pair. The node 402 may use transmission/reception 414 (e.g., radio hardware) to communicate (e.g., receive/broadcast transmissions) with the user equipment 408 over the communication channel 410. More specifically, the transmission/reception 414 is configured to transmit and receive data over the beam pair identified by the beam selection engine 404.

In one example, the beam pair be created by beamforming techniques. Thus, the antenna of the node 402 and the antenna of the user equipment 408 may be configured appropriately to communicate over the beam pair. Thus, providing 456 the node with the beam pair 410 allows the node 402 to configure beamforming and signaling configurations of the antennas or antenna arrays of the node and of the user equipment.

The geolocation data 412 (e.g., coordinates ($x_{UE}$, $y_{UE}$, $z_{UE}$) or ($x_{UE}$, $y_{UE}$) may be input to the beam selection engine 404. In other words, the search for and selection of a beam pair is based, in one example, solely on the geolocation data 412 or coordinates received from the user equipment 408. In one example, the geolocation data 412 is received at the node 402 in real time and a beam pair is selected and used for transmission at that location for a next period or determined amount of time.

FIG. 4 further illustrates a beam period engine 406. The beam period engine 406 is configured to dynamically evaluate and/or determine a beam selection period. The beam selection period is a time in which a new beam selection is performed or accomplished by the node or gNB using the beam selection engine 404. The beam period engine 406 may determine when a next beam selection operation is performed.

More specifically, the beam selection period (or update time) is the amount of time between beam pair selection operations. Embodiments of the invention are able to determine the beam selection period dynamically. Thus, the beam selection period may vary. The beam selection period is obtained or determined in real-time, in one example, by computing the time that the user equipment 408 needs to reach the next closest beam pair area using a decision function of the beam selection engine 404. In some examples, embodiments of the invention may perform a beam selection operation before the beam selection period expires. For example, changes in the velocity of the user equipment 408 above a threshold may trigger a beam selection operation. This ensures that the communication channel is changed quickly, that the node 402 adapts to changes in the geolocation of the user equipment 408, and avoids late beam pair selections.

In one example, the beam period engine 406 may determine a beam selection period or update time beam selection engine 404 using a decision function of the beam selection engine 404. The decision function, along with the user equipment coordinates ($x_{UE}$, $y_{UE}$, $z_{UE}$) and velocity ($vx_{UE}$, $vy_{UE}$, $vz_{UE}$) are used to determine the update time.

Figure 5:
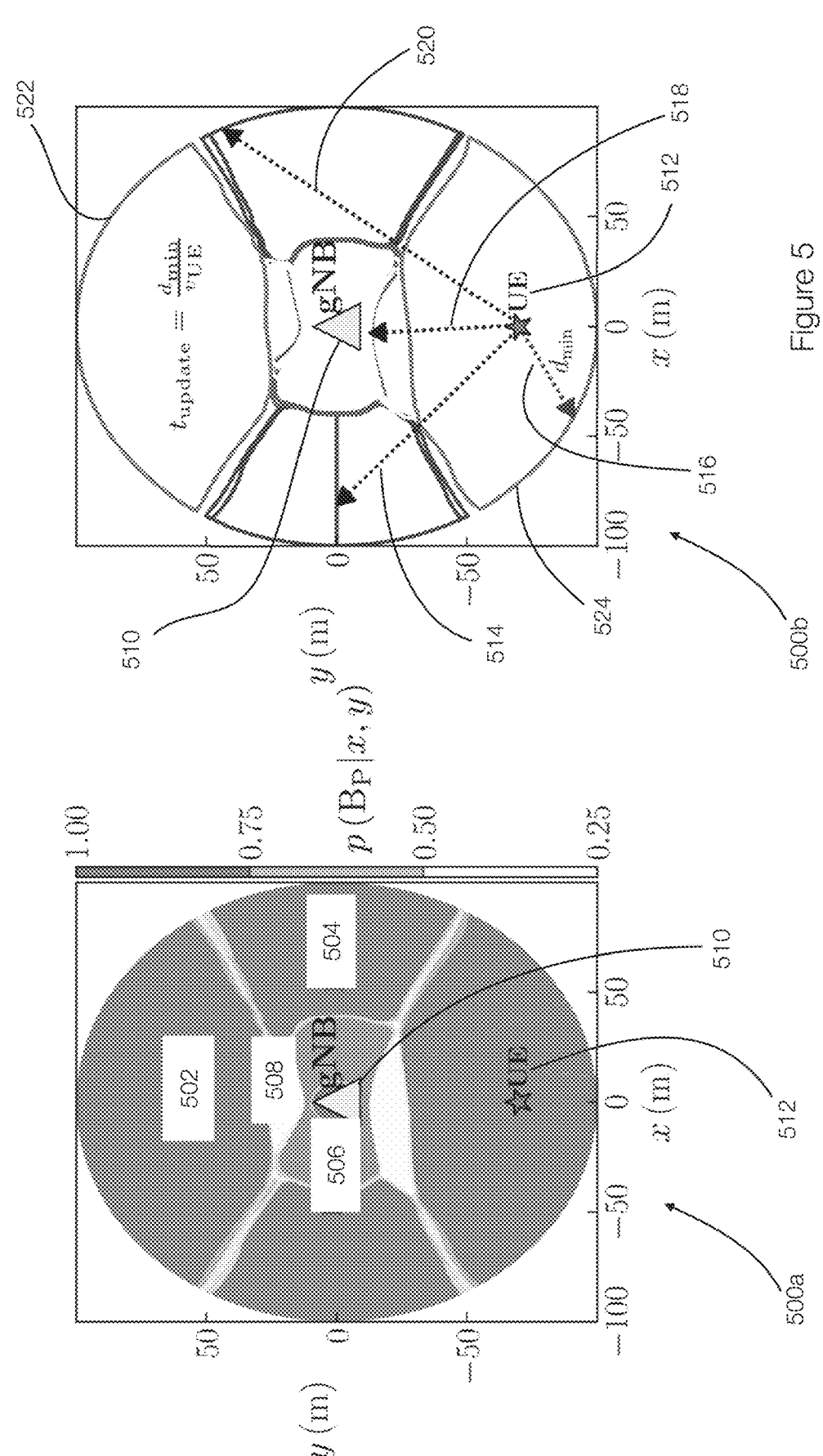
FIG. 5 discloses aspects of selecting or determining a beam selection period or a beam selection update period.

FIG. 5 discloses aspects of determining an update time or beam selection period. The beam period engine 406 (in FIG. 4) may use the beam selection engine 404 in optimizing or determining the beam selection period. In this example, the beam selection period is determined for the node or gNB 510 based on a current position of the user equipment 512. In one example, the beam selection period may be determined for each user equipment individually.

The panel 500a illustrates a decision function for four possible beam pairs 502, 504, 506, and 508 in the context of a node 510 and a user equipment 512 that is derived or determined from the beam selection engine 404. The panel 500b illustrates a decision function in which $p(B_p | x_{UE}, y_{UE}) = p_{threshold}$. More specifically, the probability of a beam pair may be lower in certain areas (e.g., when switching from one beam pair area to another. These low probabilities allow the contours to be determined.

The panel 500b illustrates contours of the decision function for the four beam pairs 502, 504, 506, and 508. Using the contours (e.g., 522, 524) determined from the decision function, a distance of the user equipment to the closest contour is determined. In this example, the arrows 514, 516, and 520 represent distances to contours and the arrow 518 represents a distance to the node or gNB 510. The arrow 516 represents the shortest distance to the nearest contour 524. The beam selection period ($t_{update}$) is obtained by determining the time that the user equipment 512 needs to reach the closest contour. The update time, in one example, is:

$$t_{update} = \frac{d_{min}}{v_{UE}}, \text{ where } v_{UE} = \sqrt{vx_{UE}^2 + vy_{UE}^2 + vz_{UE}^2} \text{ or } \sqrt{vx_{UE}^2 + vy_{UE}^2}.$$

FIG. 6 discloses aspects of a method for determining a beam selection period. The method 600 includes receiving 602 coordinates (e.g., (x,y, and/or z) coordinates) and speeds (e.g., vx, vy, vz) of a user equipment. Next, a decision function of the model (e.g., the beam selection 404) that is configured to identify beam pairs is used. More specifically, the model may identify a probability for each possible outcome (each possible beam pair) based on the geolocation of the user equipment.

Using this probability decision function, contours associated with the beam pairs are identified 606. The contours may be persisted in one example. The beam period engine may then evaluate 608 distances between the user equipment and the contours extracted from the beam pairs and select a minimum distance to a contour and/or identify a closest contour. The time $$\left( t_{update} = \frac{d_{min}}{v_{UE}} \right)$$

required for the user equipment to reach or travel the minimum distance (e.g., distance to the closest contour) is determined 610 and the next update period to a next beam selection procedure is set 612 to the determined time (e.g., $t_{update}$).

Embodiments of the invention may integrate or associate the beam selection engine 404 and the beam period engine 406 to create a system for optimizing beam selection in beamforming based transmissions. This system may be triggered on different events. In one example, the system is triggered when a variation in the speed of a user equipment exceeds a predefined threshold (e.g., 10% change in speed). The system may also be triggered using a time counter or periodically (e.g., the update time $t_{update}$).

When the system is triggered, the beam selection engine is executed to identify or select a most likely beam pair based on a position of the user equipment. The output of the beam selection engine is used by the node to set a new beam pair configuration between the user equipment and the node (nGB) and is used or applied during a next transmission. Next, the system activates the beam period engine. The output of the beam period engine is a wait or update time. The system generally performs the next beam selection operation using the beam selection engine when the update time expires or when another triggering event occurs.

Figure 7:
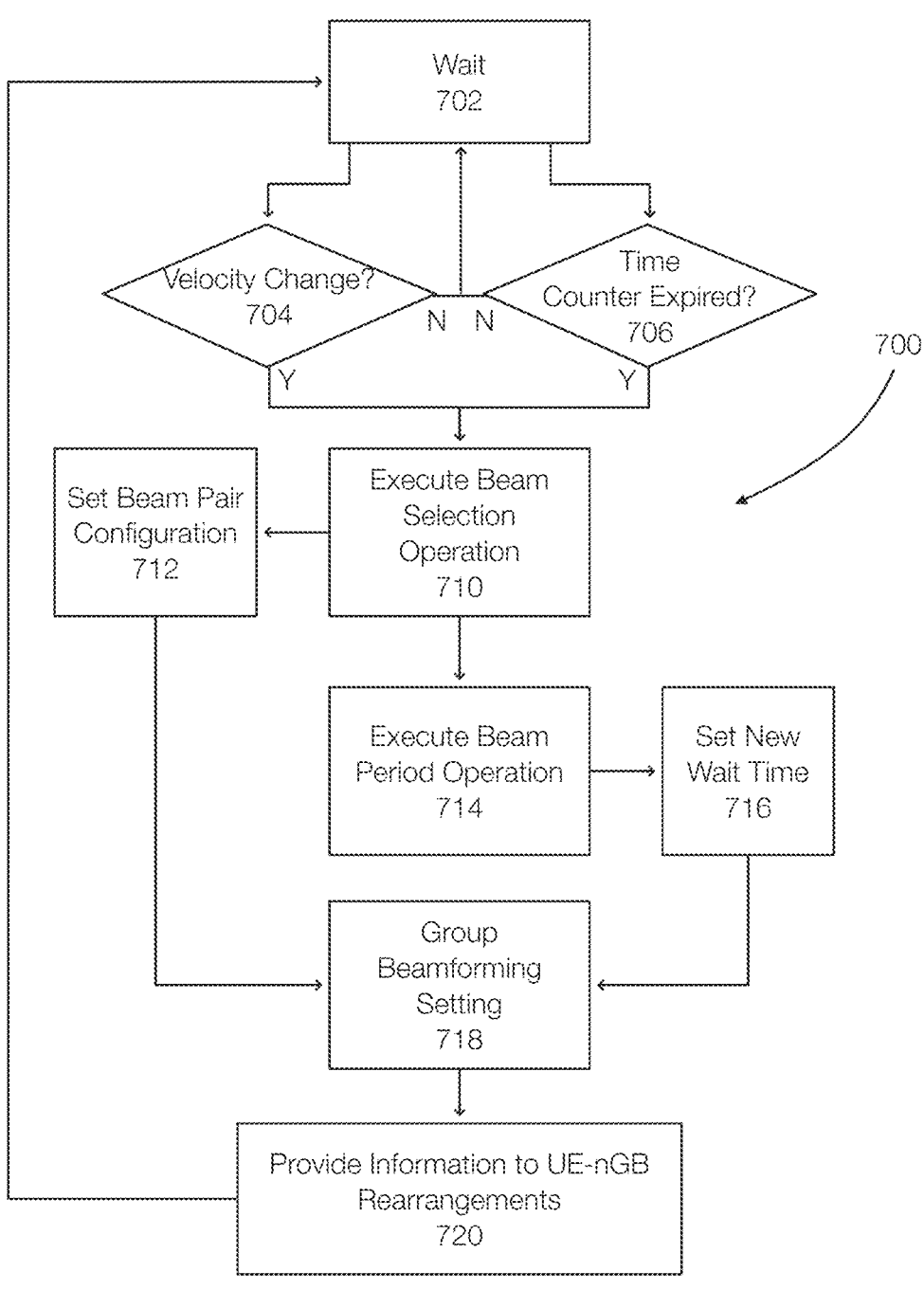
FIG. 7 discloses aspects of a beamforming operation in a system that includes a beam selection engine and a beam period engine.

FIG. 7 discloses aspects of a beamforming operation in a system that includes a beam selection engine and a beam period engine. The method 700 may operate in various states and FIG. 7 illustrates that the beamforming operation is waiting 702 or in a waiting state. The beamforming operation, while waiting, may receive input from a user equipment such as velocity and/or geolocation. If the velocity of the user equipment changes by more than a threshold (Y at 704) or if a counter or timer (e.g., the update time) has expired (Y at 706), a beam selection operation is executed or performed 710. If the velocity has not changed (N at 704) or the timer or period has not expired (N at 706), the beamforming operation or method 700 may continue to wait 702.

The beam selection operation 710 may include inputting a most recent geolocation of the user equipment into the model (e.g., the beam selection engine). The output of the model is used to set 712 the beam pair configuration for a next transmission between the node and the user equipment.

After executing 710 the beam selection operation, the beam period operation is executed or performed 714. The beam period operation uses a decision function of the beam selection engine to identify contours related to beam pairs. The contours, the velocity of the user equipment, and the current location of the user equipment are used to determine a time required for the user equipment to reach a closest border. This time ($t_{update}$) is set 716 as a new wait time (e.g., the time counter used at 706). These settings (beam pair selected and update time) are grouped 718 and provided the node (gNB), which configures or rearranges 720 the node accordingly for subsequent transmissions.

Experiments and Results

In order to test whether embodiments of the invention improve or optimize beam pair selection operations and beam period determination operations, a simulation framework using the NS-3 Network Simulator with the mmWave add-on and the NS3-Gym is used. The NS-3 is an open-source software for telecommunications research purposes.

FIG. 8A discloses aspects of parameters used to generate a dataset as described with reference to at least FIG. 2. The table 800 illustrates example parameters. In one example, the carrier frequency, bandwidth, and transmission powers were configured to emulate an mmWave scenario. The gNB and UE are equipped with a uniform planar array of 8×8 and 1×2 elements, respectively. The channel update period is a period where the wireless channel remains constant. The path-loss model was configured according to the 3GPP TR 38.901, which describes the mathematical parameters to simulate the propagation losses over the distance. The RF radiating elements are configured into a uniform planar array of 8×8 on the gNB and 1×2 on the UE. Some simulation parameters differ in relation to the sampling procedure and the validation trials.

Figure 8B:
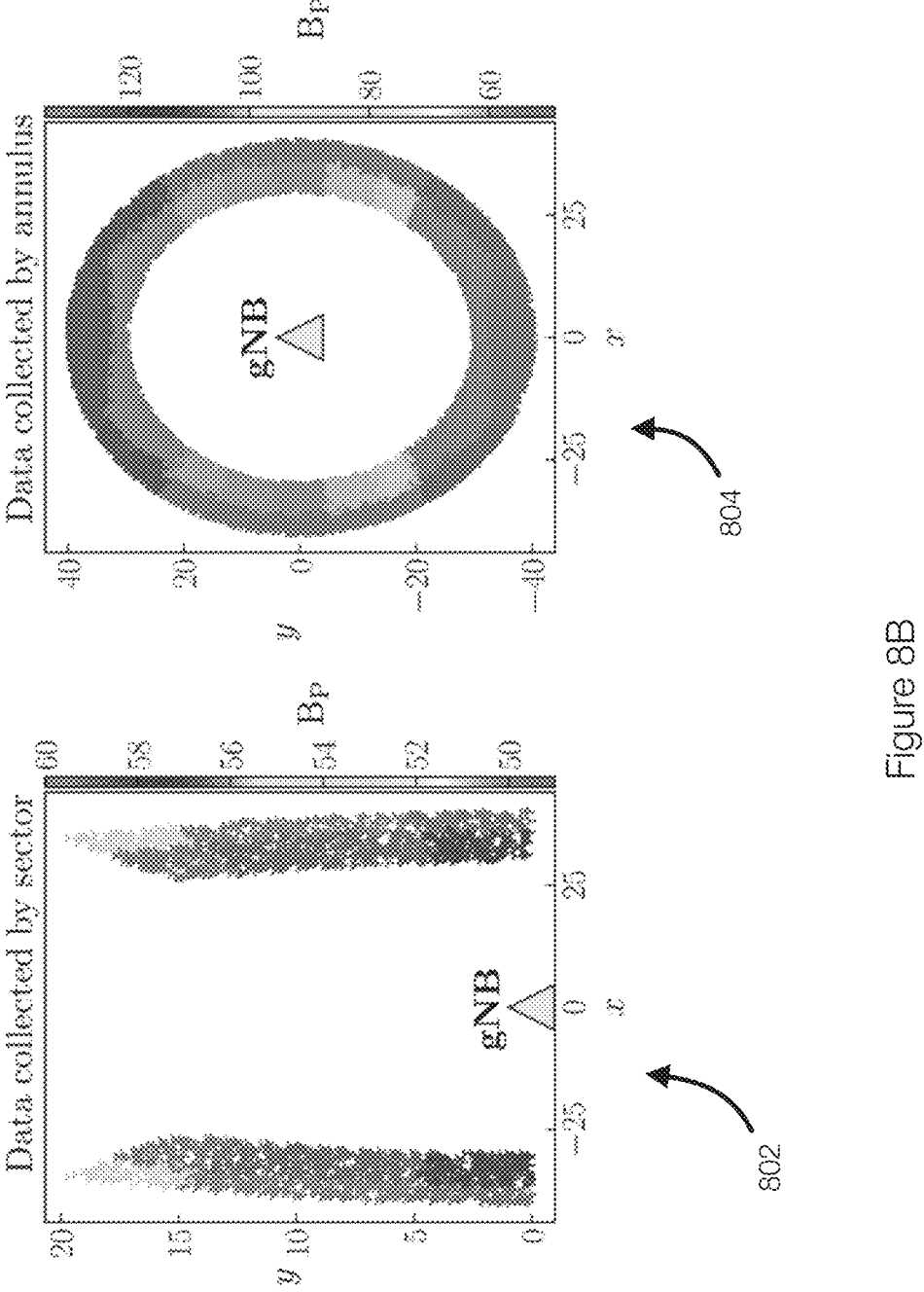
FIG. 8B discloses aspects of data sampling.

FIG. 8B discloses aspects of data sampling or data collection. An example first step is to create the dataset containing the beam pairs attached to positions around the gNB. The spatial region in which data sampling was carried out goes from r=20 meters to r=90 meters, where r is the inner radius for each annulus. In one example, the annulus is divided into 12 sectors. Data collection for each sector was made using an exhaustive beam search procedure. An NS-3 simulation was implemented using sampling parameters provided in the table 800.

In this simulation, the UE is located in a random position inside a sector, and transmission is emulated during $t_s$=0.2. Given the small time that the channel remains constant and the small beam selection period, a large number of beam-forming selections are gathered using random positions. In this manner, the beam pairs, their instantaneous power spectral density, and the UE positions are stored. Using this information, a representative beam pair entry is found by searching the selection with the highest instantaneous power spectral density and averaging coordinates attached to the beam pair. For each sector, 1000 trials were simulated where seeds for random channel generation were changed for each realization. In order to generate a dataset for an annulus, the previous procedure was implemented for all 12 sectors.

The panel 802 illustrates data collections for sectors 1 and 6 of an annulus with an inner radius of 40 m. More specifically, the panel 802 illustrates data collected for two sectors and the panel 804 relates to all data collected in the annulus r=40 m.

Figure 8C:
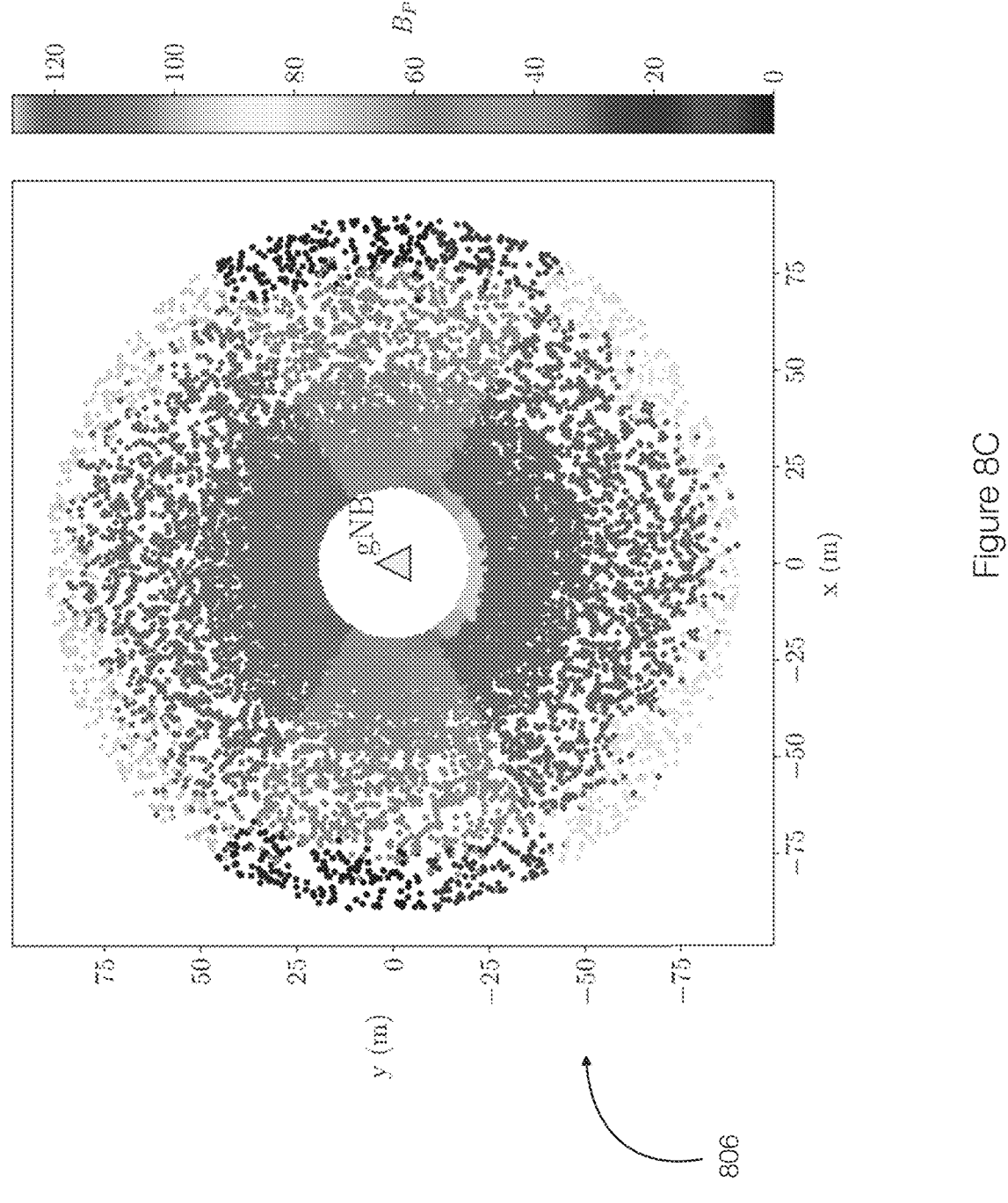
FIG. 8C discloses aspects of a final data set collected from an environment and related to selecting a beam pair in a network.

FIG. 8C discloses aspects of a final data set by joining data collected for all the annuli. The panel 806 represents the final dataset.

Once the dataset is obtained through NS-3 simulation, a training phase is initiated by tuning hyperparameters. Using the dataset, the training phase was performed by tuning hyperparameters for candidate models using the Optuna framework. Candidate models included MLP Multilayer Perceptron (MLP), Random Forest, and K-Nearest Neighbors (KNN) models. The MLP model was chosen because of the highest value of 3-fold cross-validation.

Figure 8D:
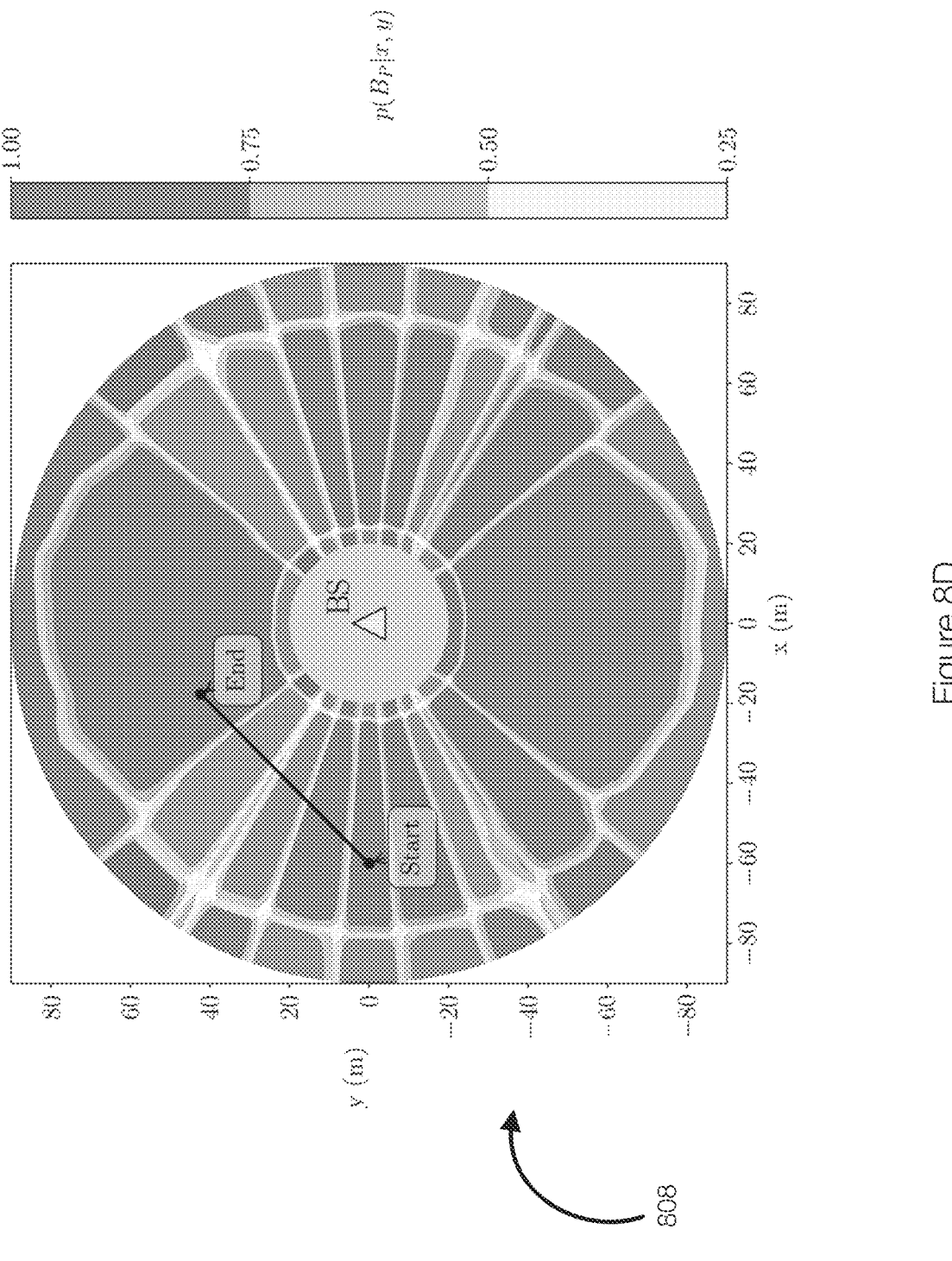
FIG. 8D discloses aspects of a decision function for a trained model.

FIG. 8D discloses aspects of a decision function for the MLP trained model. In FIG. 8D, decision zones are segmented through the ML model trained in the training phase. The coordinates around the gNB are mapped into a probability function $p(B_p|x, y)$ that gives a probability value from 0 to 1 to predict what beam pair is most likely to occur in a given coordinate. Also, the present plot 808 shows the transitions between the beam pair serving areas, allowing a determination to be made regarding positions where the probability is low. The low probability areas are examples of boundaries that allow embodiments of the invention to determine how far the UE is from these borders. This information is used when performing a beam period operation to determine a next update time. In FIG. 8D, the trajectory of 50 validation samples simulated is described by a black line, showing the starting and ending point of the UE movement.

In order to test if machine learning based beam selection and machine learning based beam period determination improve or optimize the beam pair selection operations and the beam period determination operation, two more NS-3 simulations were implemented. The first NS-3 implementation uses the exhaustive beam search already implemented in the mmWave module, and the second NS-3 implementation is in accordance with embodiments of the invention.

For both simulations, the same parameters in the table 800 are used. The channel update, beam selection period (or update time), and simulation time were changed to 100 ms, 50 ms, and 30 s, respectively. In the second simulation, the exhaustive beam search method is replaced with embodiments of the invention. The $p_{threshold}$ for computing dynamic beam pair update time was set to be $p_{threshold}$=0.5. The UE trajectory in which evaluation is performed is shown in FIG. 8D (the line from start to end). To remove noise and get an average of the performance of the model, a total of 50 samples of the same UE trajectory were evaluated but with different seeds to achieve statistically independent simulations.

Figure 8E:
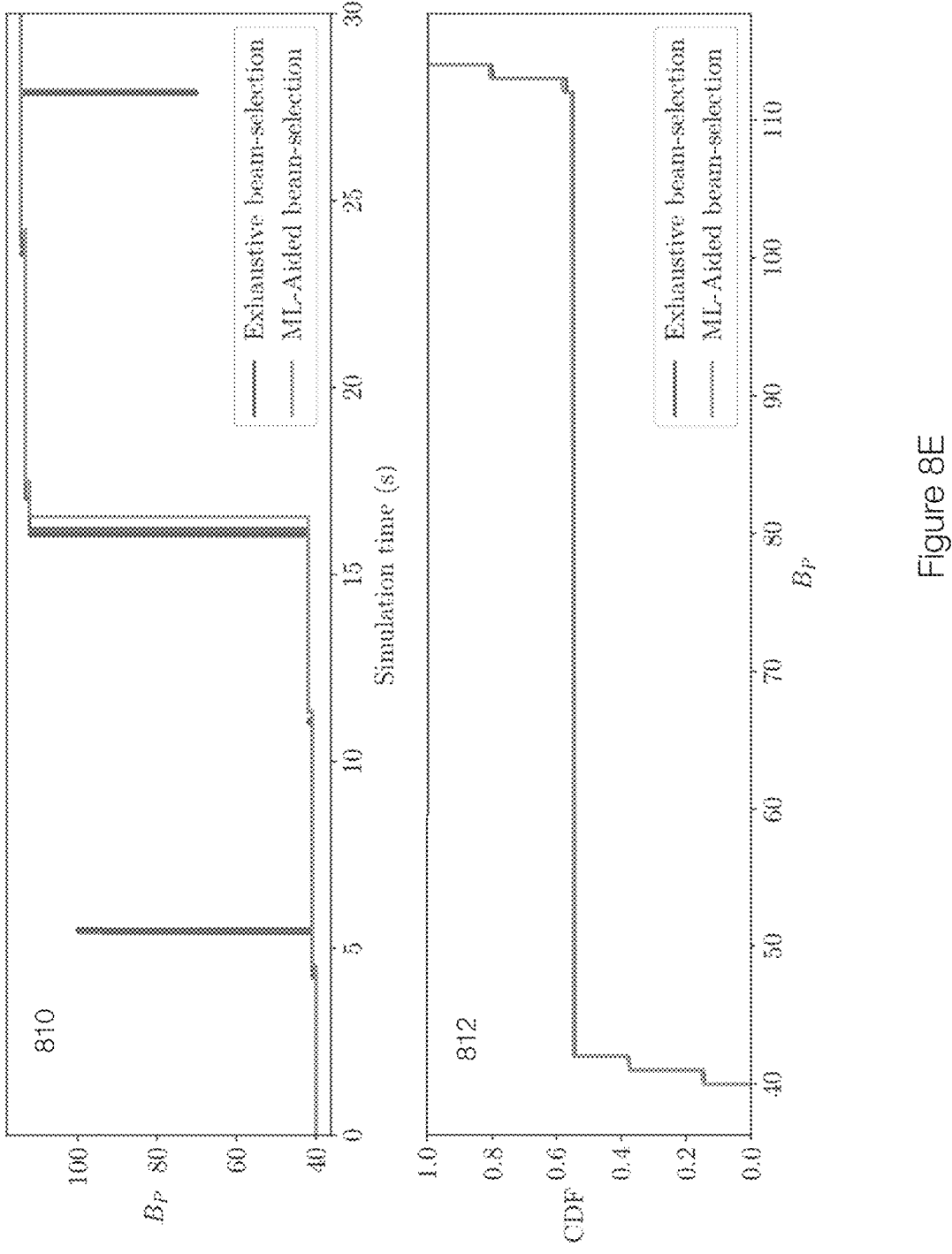
FIG. 8E discloses aspects of a comparison between selecting a beam pair using an exhaustive search method and a machine learning assisted beam selection method.

FIG. 8E discloses aspects of a comparison between an exhaustive search method and embodiments of the invention. After running 50 trials of simulations, FIG. 8E illustrates that machine learning based methods are able to choose or select same beam pair pattern in comparison to the exhaustive search method. In the panel 810, a single trial is illustrated where strong variations of the beam pair are evidenced in regions close to the edge of the beam pair serving areas. Advantageously, embodiments of the invention overcome this variation and keep a constant behavior along the simulation.

More specifically, the panel 810 illustrates a beam pair pattern chosen for a random sample, and the panel 812 shows the Cumulative Distribution Function (CDF) computed over all samples. Due to the sensibility of the exhaustive beam-selection search on regions of beam pair exchange, a strong variation of the beam pair can be seen in comparison with the machine learning based system disclosed herein. This variation causes an excess of beam pair changes, therefore occupying radio resources to transmit pilot signals when the system could be using the radio resources to transmit data as occurs on the machine learning based system.

Figure 8F:
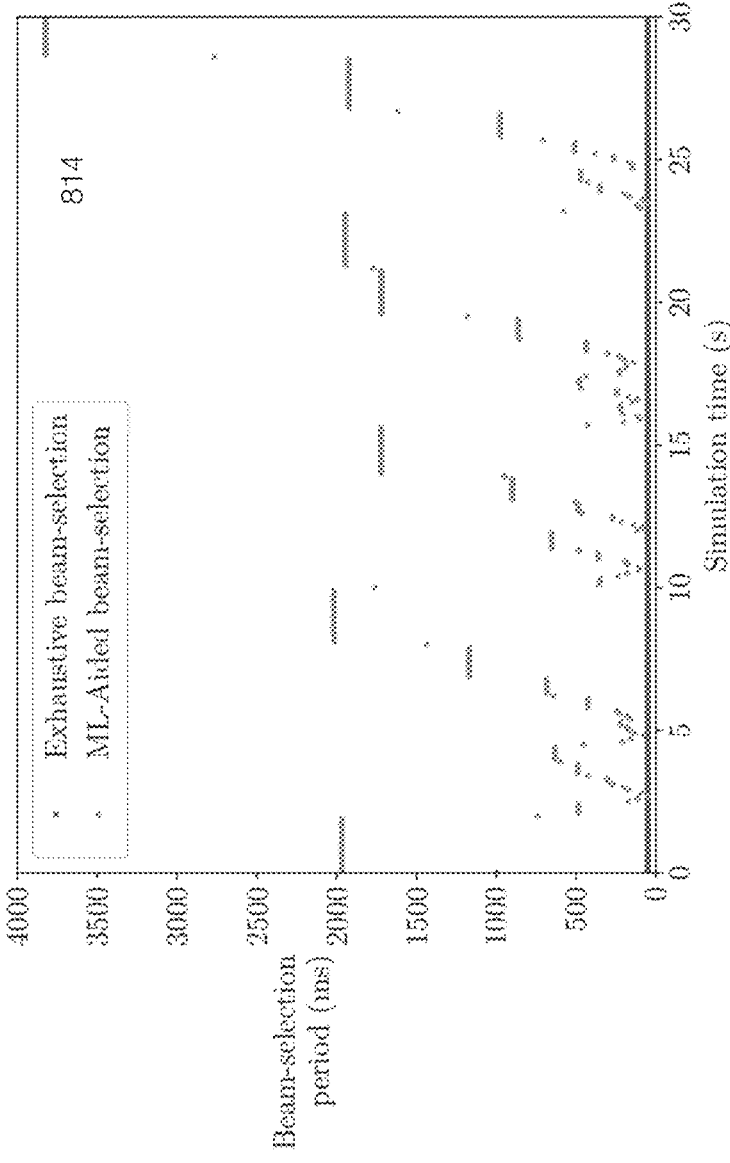
FIG. 8F discloses aspects of a comparison between determining a beam selection update period in the context of exhaustive search and in the context of machine learning assisted beam pair selection.

FIG. 8F illustrates a comparison between the beam selection period for the exhaustive search method and embodiments of the invention. Using a dynamic beam-selection period, the machine learning based selection period wait time between beam-selections is larger when compared to the exhaustive search, which has a fixed update period $t_{update}=50$ ms. This is reflected in embodiments of the invention in fewer beam selection procedures and, consequently, less control signaling exchange between the UE and the gNB, advantageously allowing the resources to be used on the data transmission itself.

Note that the beam-selection period is fixed at 50 ms in the exhaustive search technique, in contrast to embodiments of the invention. Embodiments of the invention are able to dynamically assign beam selection periods according to the UE position and speed. This feature promotes better usage of the radio resources because unnecessary signaling exchanges between the UE and the gNB are avoided. In positions where UE is distant from the probability threshold contour, embodiments of the invention assign a higher beam selection period, leading to a non-disturbed data flow because the number of beamforming configurations was optimized or improved. Because of that, embodiments of the invention can outperform the exhaustive beam-selection technique in terms of throughput.

Figure 8G:
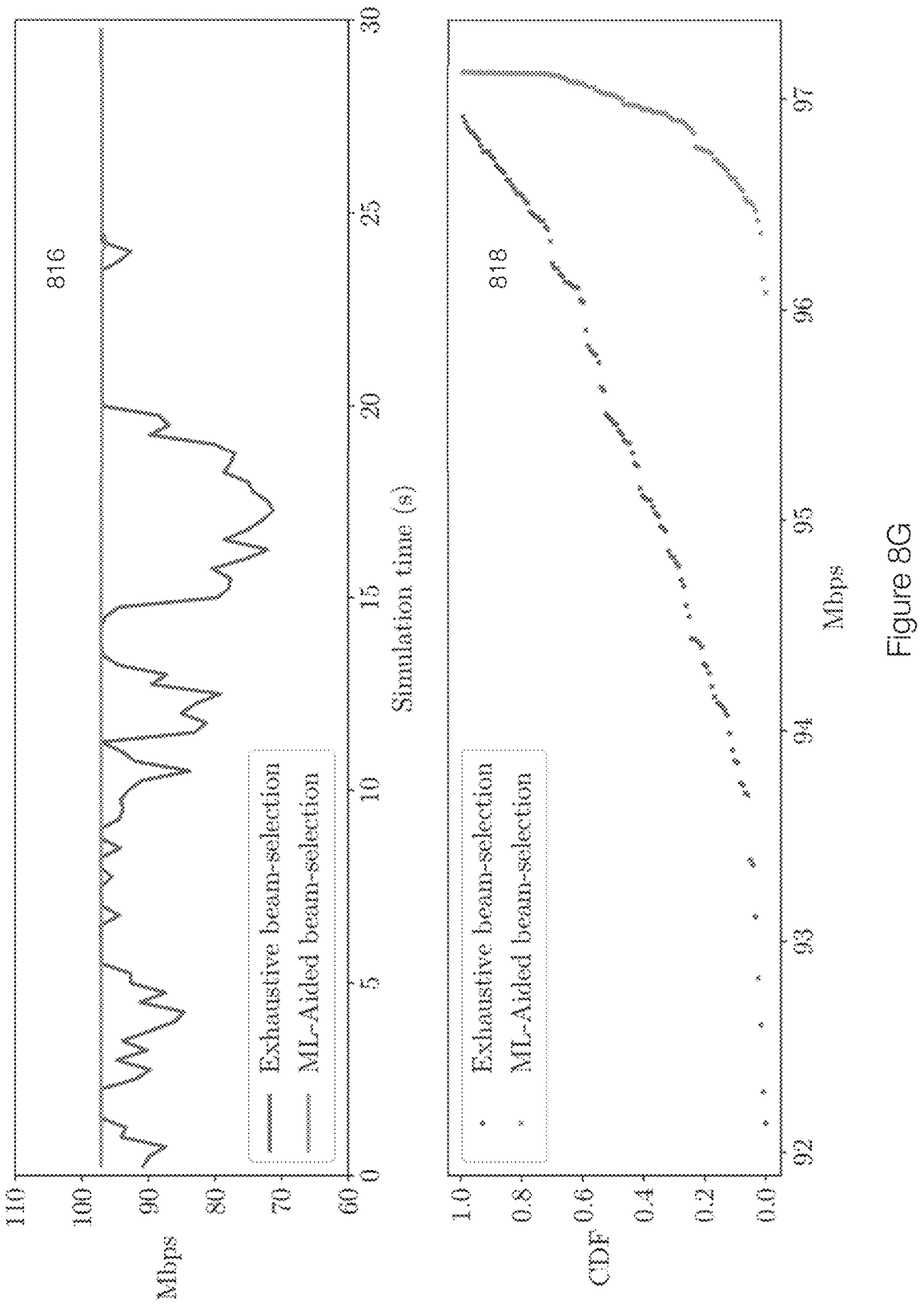
FIG. 8G discloses aspect of gains in terms of throughput.

FIG. 8G discloses aspects of gains in terms of throughput for a single validation trial and a CDF. This behavior is explained by a decrease in interruptions on data flow transmission. More specifically, the successive beamforming settings reconfigurations after each 50 ms performed during an exhaustive search approach impairs the data plane packet forwarding. In contrast, embodiments of the invention maintain longer periods between beam selection operations and the resources are available for more time to perform data plane packet forwarding.

The panel 816 shows the throughput for a single sample, and the panel 818 shows the CDF computed over all samples. With fewer interruptions on the data flow to perform control signaling exchange between the UE and the gNB, the radio resources are available for a longer time for purely data transmission.

Embodiments of the invention provide multiple advantages. For example, the update time or beam selection period between beam selection operations in the exhaustive search method is fixed at 50 ms. In embodiments of the invention, the average time between beam selection operations is about 1165 ms over the 50 samples. This is an improvement of 2330%. This result reflects directly on the number of beam selection operations that are performed. Because that exhaustive beam selection is performed in a fixed period of 50 ms, a total of 600 beam selection operations are performed in a simulation of 30 s. In embodiments of the invention, using the dynamic beam selection period optimization, an average of 75 beam pair selection operations are performed over the same period. This represents a reduction of 87.5%.

The average execution time for performing the beam pair selection operation is reduced. The time needed to select the beam pair through exhaustive search is high as the codebooks need to be swept to find the maximum received powers. In contrast, embodiments of the invention rely on a prediction from a machine learning model (e.g., a classification model), which is much faster than the exhaustive search. The execution time of the validated multilayer perceptron model (e.g., the beam selection engine 404) is less than 0.5% of the time needed to perform the exhaustive search. This also leads to better usage of radio resources because the time for control procedures is reduced, and more time is dedicated to the data flow.

Embodiments of the invention can improve or optimize a beamforming search period and selection in networks, including 5G networks. In one example, embodiments of the invention may be implemented as software that may run or execute on a network node, such as a base station or access point, to improve or optimize the beam pair selection operation and the update period. The software can receive network information and beamforming parameters and use machine learning algorithms to provide real-time optimization of both the beamforming search period, leading to reduced latency and overhead and increased energy efficiency.

Embodiments of the invention may also be implemented as hardware that can be added to a network node. The hardware module can receive network information and beamforming parameters and use machine learning algorithms to provide real-time optimization of both the beamforming search period and selection of the beam pair, leading to reduced latency and overhead and increased energy efficiency.

Embodiments of the invention may be implemented as an XApp (extended Application) that runs on an O-RAN (Open Radio Access Network) architecture. The XApp can receive network information and beamforming parameters and use machine learning algorithms to provide real-time optimization of both the beamforming search period and selection of the beam pair, leading to reduced latency and overhead and increased energy efficiency.

Embodiments of the invention may be implemented as a system that optimizes beam management procedures, including initial access, beam change, and serving cell change. The system can receive network information and beamforming parameters and use machine learning assistance to provide real-time optimization of both the beamforming search period and selection of a beam pair, leading to reduced latency and overhead and increased energy efficiency.

As apparent from this disclosure, an embodiment of the invention may possess various useful features and aspects, although no embodiment is required to possess any of such features or aspects. Embodiments of the invention may include or relate to beamforming operations, beam pair selection operations, update time determination operations, contour related operations, decision function operations, radio transmission operations, and the like. Embodiments of the invention may relate to any operations related to beamforming, beam pair selection, and/or updating the selected beam pair.

Following are some further example embodiments of the invention. These are presented only by way of example and are not intended to limit the scope of the invention in any way.

Embodiment 1. A method comprising: receiving coordinates from a user equipment at a beam pair configuration system integrated with a node of a network, performing a beam selection operation to select a most likely beam pair using a beam selection engine that is trained to predict the most likely beam pair for communicating with the user equipment, wherein an input to the beam selection engine includes the coordinates of the user equipment, configuring the node and the user equipment to communicate using the most likely beam pair during a next transmission, and determining an update time based on the coordinates of the user equipment and a velocity of the user equipment.

Embodiment 2. The method of embodiment 1, wherein the coordinates comprise geolocation data or GPS (Global Positioning System) data.

Embodiment 3. The method of embodiment 1 and/or 2, wherein the beam selection operation is performed using only the coordinates of the user equipment.

Embodiment 4. The method of embodiment 1, 2, and/or 3, further comprising receiving the velocity of the user.

Embodiment 5. The method of embodiment 1, 2, 3, and/or 4, further comprising performing a next beam selection operation to select a next beam pair when the update time expires or when the velocity changes by more than a threshold amount.

Embodiment 6. The method of embodiment 1, 2, 3, 4, and/or 5, wherein determining the update time includes determining contours of areas associated with beam pairs using a decision function of the beam selection engine and determining a distance to a closest contour, wherein the update time is a time required for the user equipment to reach the closest contour.

Embodiment 7. The method of embodiment 1, 2, 3, 4, 5, and/or 6, wherein the contours are determined by mapping coordinates around the node to a probability function that predicts what beam pair is most likely to occur in a given coordinate, wherein contours correspond to coordinates with low probabilities.

Embodiment 8. The method of embodiment 1, 2, 3, 4, 5, 6, and/or 7, further comprising collecting data for training the beam selection engine, the collected data including beam pairs, at least one signal quality characteristic, and user equipment coordinates, wherein the data is collected by dividing a range of the node into annuli and dividing each annulus into sectors.

Embodiment 9. The method of embodiment 1, 2, 3, 4, 5, 6, 7, and/or 8, wherein the signal quality characteristic is one of a power spectral density, a signal strength, a noise level, or a signal to noise ratio.

Embodiment 10. The method of embodiment 1, 2, 3, 4, 5, 6, 7, 8, and/or 9, further comprising configuring the node and the user equipment to communicate using the most likely beam pair, wherein the update time is dynamic and wherein the beam selection engine includes one of a multilayer perceptron, a random forest, or a K nearest neighbor model.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term client, module, component, engine, agent, service, or the like may refer to software objects or routines that execute on the computing system or may also refer to hardware depending on context. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments, which may be remote or on-prem, where one or more of a client, server, or other machine may reside and operate in a cloud environment.

Figure 9:
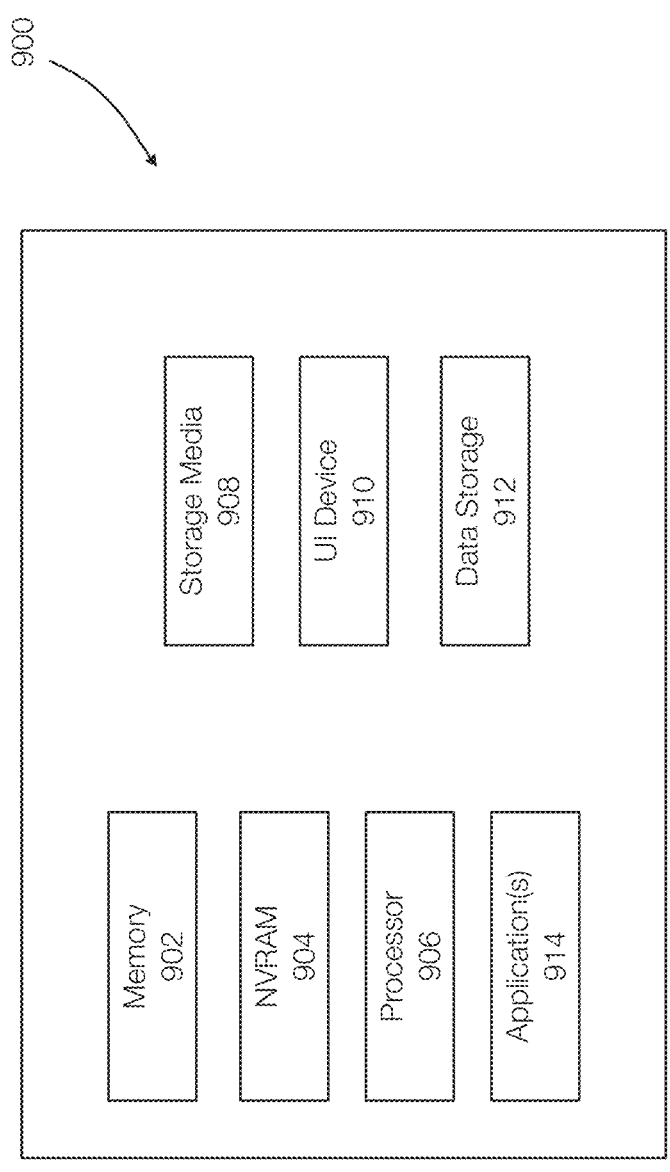
FIG. 9 discloses aspects of a computing device, system, or entity.

With reference briefly now to FIG. 9, any one or more of the entities disclosed, or implied, the Figures and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The device 900 may also be representative of servers, clusters of servers, nodes, or the like. The computing resources represented by the device 900 may represent computing resources of a cloud provider that can be allocated or used for energy aware compression operations.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving coordinates from a user equipment at a beam pair configuration system integrated with a node of a network;
   performing a beam selection operation to select a most likely beam pair using a beam selection engine that is trained to predict the most likely beam pair for communicating with the user equipment, wherein an input to the beam selection engine includes the coordinates of the user equipment;
   configuring the node and the user equipment to communicate using the most likely beam pair during a next transmission; and
   determining an update time based on the coordinates of the user equipment and a velocity of the user equipment, wherein determining the update time includes determining contours of areas associated with beam pairs using a decision function of the beam selection engine and determining a distance to a closest contour, wherein the update time is a time required for the user equipment to reach the closest contour.

2. The method of claim 1, wherein the coordinates comprise geolocation data or GPS (Global Positioning System) data.

3. The method of claim 1, wherein the beam selection operation is performed using only the coordinates of the user equipment.

4. The method of claim 1, further comprising receiving the velocity of the user.

5. The method of claim 1, further comprising performing a next beam selection operation to select a next beam pair when the update time expires or when the velocity changes by more than a threshold amount.

6. The method of claim 1, wherein the contours are determined by mapping coordinates around the node to a probability function that predicts what beam pair is most likely to occur in a given coordinate, wherein contours correspond to coordinates with low probabilities.

7. The method of claim 1, further comprising collecting data for training the beam selection engine, the collected data including beam pairs, at least one signal quality characteristic, and user equipment coordinates, wherein the data is collected by dividing a range of the node into annuli and dividing each annulus into sectors.

8. The method of claim 7, wherein the signal quality characteristic is one of a power spectral density, a signal strength, a noise level, or a signal to noise ratio.

9. The method of claim 1, further comprising configuring the node and the user equipment to communicate using the most likely beam pair, wherein the update time is dynamic and wherein the beam selection engine includes one of a multilayer perceptron, a random forest, or a K nearest neighbor model.

10. A non-transitory storage medium having stored therein instructions that are executable by one or more hardware processors to perform operations comprising:
   receiving coordinates from a user equipment at a beam pair configuration system integrated with a node of a network;
   performing a beam selection operation to select a most likely beam pair using a beam selection engine that is trained to predict the most likely beam pair for communicating with the user equipment, wherein an input to the beam selection engine includes the coordinates of the user equipment;
   configuring the node and the user equipment to communicate using the most likely beam pair during a next transmission; and
   determining an update time based on the coordinates of the user equipment and a velocity of the user equipment, wherein determining the update time includes determining contours of areas associated with beam pairs using a decision function of the beam selection engine and determining a distance to a closest contour, wherein the update time is a time required for the user equipment to reach the closest contour.

11. The non-transitory storage medium of claim 10, wherein the coordinates comprise geolocation data or GPS (Global Positioning System) data.

12. The non-transitory storage medium of claim 10, wherein the beam selection operation is performed using only the coordinates of the user equipment.

13. The non-transitory storage medium of claim 10, further comprising receiving the velocity of the user.

14. The non-transitory storage medium of claim 10, further comprising performing a next beam selection operation to select a next beam pair when the update time expires or when the velocity changes by more than a threshold amount.

15. The met non-transitory storage medium hod of claim 10, wherein the contours are determined by mapping coordinates around the node to a probability function that predicts what beam pair is most likely to occur in a given coordinate, wherein contours correspond to coordinates with low probabilities.

16. The non-transitory storage medium of claim 10, further comprising collecting data for training the beam selection engine, the collected data including beam pairs, at least one signal quality characteristic, and user equipment coordinates, wherein the data is collected by dividing a range of the node into annuli and dividing each annulus into sectors.

17. The non-transitory storage medium of claim 16, wherein the signal quality characteristic is one of a power spectral density, a signal strength, a noise level, or a signal to noise ratio.

18. The non-transitory storage medium of claim 10, further comprising configuring the node and the user equipment to communicate using the most likely beam pair, wherein the update time is dynamic and wherein the beam selection engine includes one of a multilayer perceptron, a random forest, or a K nearest neighbor model.

\* \* \* \* \*